UNITED STATES PATENT OFFICE.

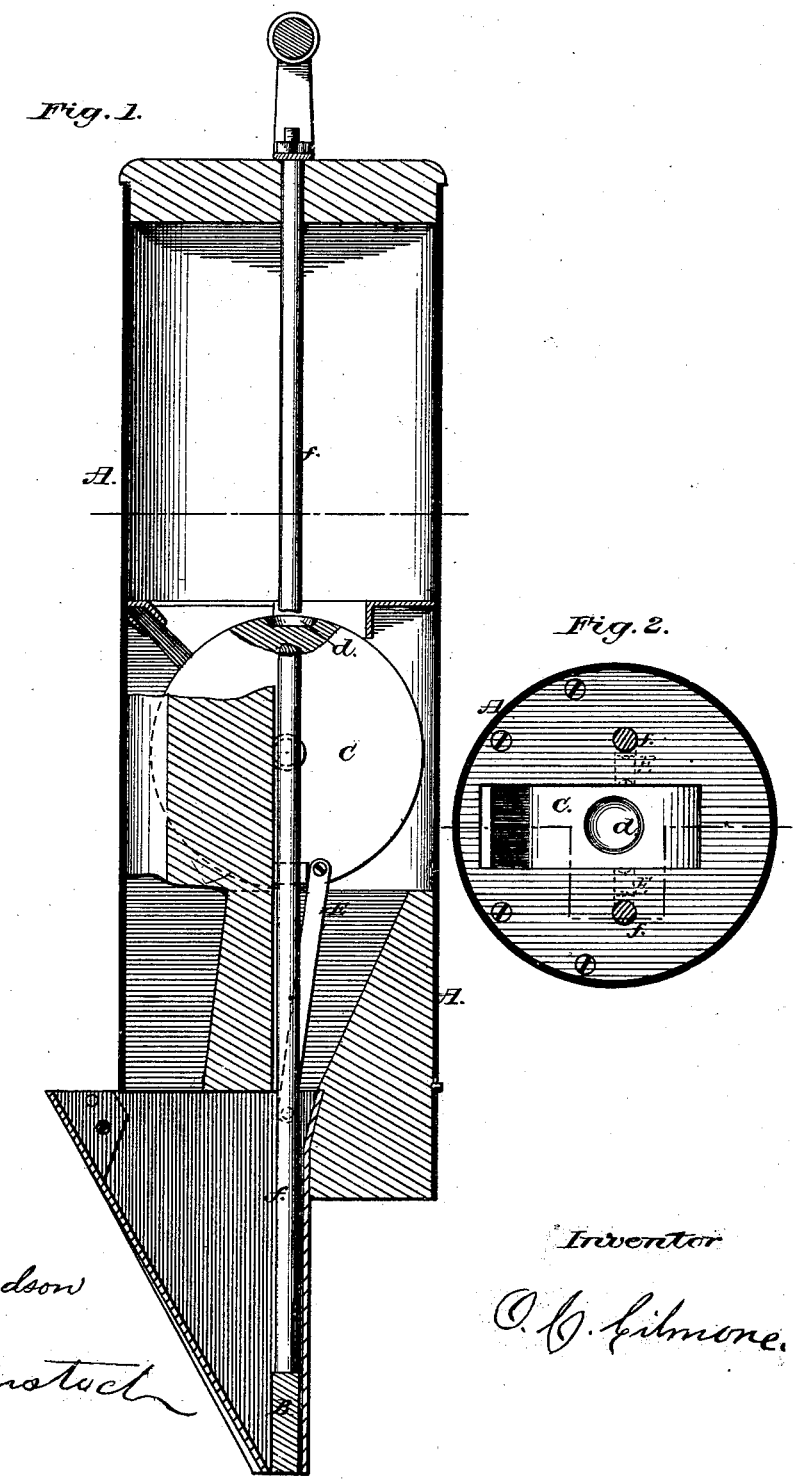

ORPHEUS C. GILMORE, OF JANESVILLE, WISCONSIN.

IMPROVEMENT IN HAND CORN-PLANTERS.

Specification forming part of Letters Patent No. 168,389, dated October 5, 1875; application filed June 17, 1875.

*To all whom it may concern:*

Be it known that I, ORPHEUS C. GILMORE, of Janesville, county of Rock and State of Wisconsin, have invented a new and useful Improvement in Hand Corn-Planters, which improvement is fully set forth in the following specification, reference being had to the accompanying drawing.

The object of my invention is to produce a hand corn and seed planter simple in construction and certain in its operation, so that the work of planting may be facilitated and made easy, and the machine may be such as all agriculturists can afford to purchase.

To avoid friction, and do away with complicated machinery, and make my machine durable, I form the case A of sheet-iron, or other equivalent material, terminating at the lower extremity with a wedge-shaped point, which opens and closes as the seed is discharged into the soil by means of a plunger, B, worked by double-piston rods $f\,f$, at the top of which a handle is attached. Within the case A is a bed-piece, on which is pivoted the rotary cylinder C with its pocket $d$. Upon opposite sides of said cylinder are attached the reciprocating connecting-rods E E, the other ends of which are pivoted to the piston-rods $f\,f$, which rods, always working in a vertical position, rotate the cylinder and operate the plunger, by which the lower point of the case A is opened and closed, and by means of the power being applied direct to the rotating cylinder, and the plunger, with no gear or intermediate machinery, the machine is made to work with certainty and facility.

I do not claim the cylinder C, or the reciprocating motion, for these are in common use; but

I claim as my invention—

The connecting-rods E E, in combination with the rods $f\,f$ and cylinder C, for the purpose of operating the cylinder C, substantially as described, and for the purposes set forth.

O. C. GILMORE.

Witnesses:
S. HENRY HUDSON,
H. N. COMSTOCK.